Aug. 24, 1926.
L. M. CRAIG
1,597,512
CHORD CALCULATOR
Filed July 8, 1925
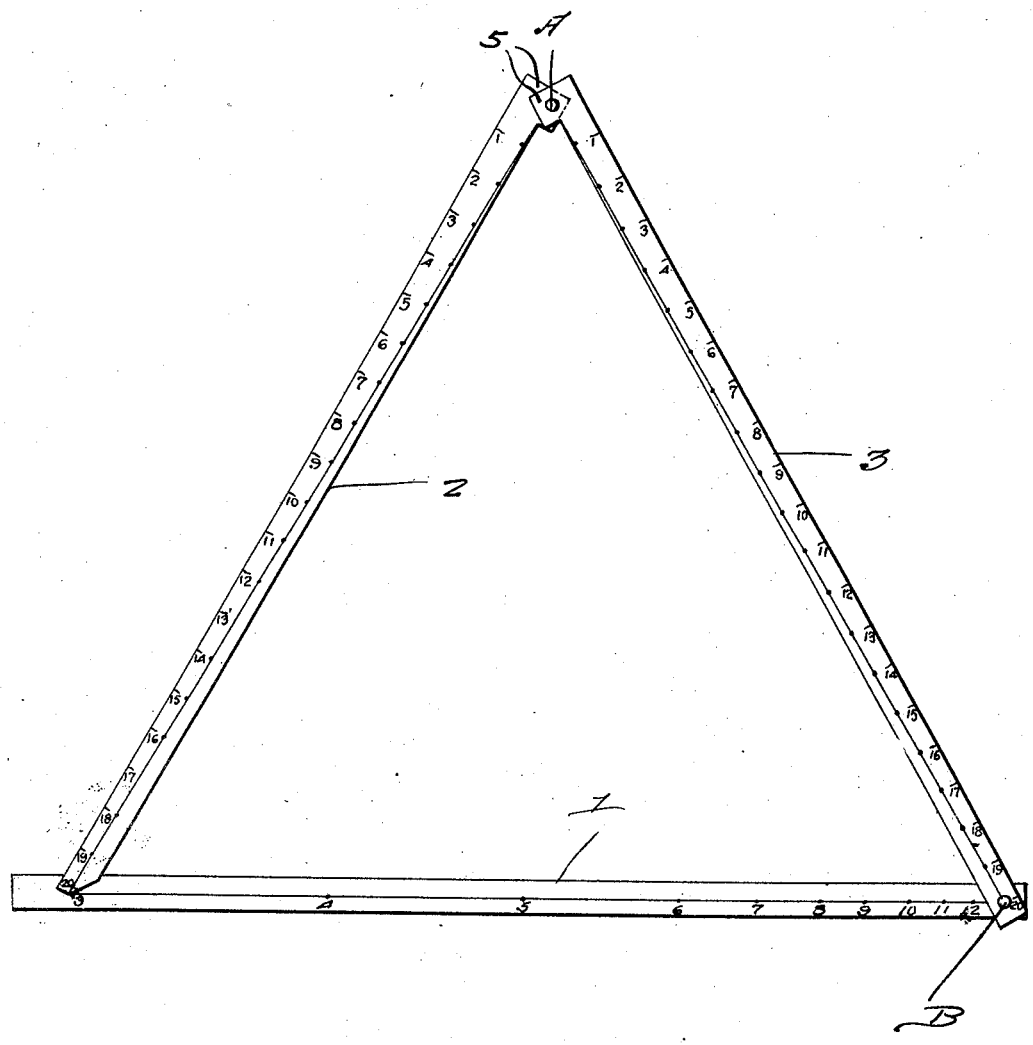
Inventor
L. M. Craig
By Clarence A. O'Brien
Attorney Patented Aug. 24, 1926.

1,597,512

UNITED STATES PATENT OFFICE.

LESTER MAY CRAIG, OF ALEXANDRIA, LOUISIANA.

CHORD CALCULATOR.

Application filed July 8, 1925. Serial No. 42,232.

The present invention relates to a device for ascertaining by mechanical means the length of the chords which would subtend the arcs of a circle where said arcs were of equal length. The device is useful to machinists, draftsmen, and others who have a given circle and desire to divide the circumference thereof into any number of equal parts.

In the drawing:—

The figure is a plan view of the device showing one embodiment of the invention.

Referring to the drawing in detail, it will be seen that the calculator consists of three scales or legs 1, 2 and 3. The legs 2 and 3 are provided with offset extensions 5 which are pivoted together as is indicated at A. The other end of the leg 3 is pivoted to the leg 1 as at B. On the leg 1 or scale there is spaced off the chords of the largest circle which the calculator is to cover. The indicia shown in the drawing takes care of all chords from 3 to 12. It is to be understood that the calculator functions only in ascertaining the chords made by the sides of regular inscribed polygons. The chords that are to be spaced on the scale 1, measuring each from the pivot B, may be found by trigonometry, that is by multiplying the diameter of the circle by the sine of one-half of the angle that sub-tends the desired chord. These distances are numbered on the scale 1 as will be seen from an inspection of the drawing. All the chords of the largest circle are found in this manner and laid off on scale 1 starting from the pivot B and given their respective numbers as is indicated on the scale by the indicia 3, 4, 5, ... 12.

The scales or legs 2 and 3 may be of any length, but must be evenly divided into as many equal parts as is signified by the diameter of the largest circle that the calculator is made for. That is, if the largest chord on scale 1 is chord $3^B$ on scale 1 of a seven inch circle, then scales 2 and 3 must be divided into seven equal parts, and these parts may be sub-divided into eight or sixteen equal parts. Scales 2 and 3 may be of any desired length as long as they are both of the same length, but preferably should be about the same length as scale 1.

If it is desired to divide the circumference of a twenty inch circle into three equal parts, it is necessary to set the dividers on scale 1 from B to 3.

If the length of the chord is desired when a five inch circle is divided into three equal parts, the free end of scale 2 is disposed adjacent to the indicia 3 on scale 1 (as shown in the drawing). The length of the chord is then obtained by taking a pair of dividers and placing them between 5 of scale 2 and 5 of scale 3.

If the length of the chord is desired when a six inch circle is divided into eight equal parts, the free end of scale 2 is disposed adjacent to indicia 8 on scale 1 and the dividers are set between 6 on scale 2 and 6 on scale 3, which is the length of the desired chord.

It is thought that the construction, utility, and advantages of this invention will now be clearly understood without a more detailed description thereof. It is apparent that the device may be used for various other calculations than those exemplified above, and that numerous changes in the details of construction, in the combination and arrangement of parts may be resorted to without departing from the spirit or scope of the invention as hereinafter claimed or sacrificing any of its advantages.

Having thus described the invention, what I claim as new and desire to secure by Letters Patent is: —

A chord determining device of the class described including an elongated straight scale having a line formed thereon coincident with the median longitudinal axes thereof and provided with indicia arranged along the line indicative of the lengths of the chords of the largest circle with which the device is adapted to be used, a pair of elongated straight scales each having at one end an offset extension, the extensions being pivoted together, said second mentioned pair of scales being of equal length and each having a line formed thereon extending from the common pivot diagonally of one face thereof, one of said second mentioned scales being pivoted at one end to one end of the first mentioned scale, the free end of the other of the second mentioned scales terminating in a point, the lines on said second mentioned scales terminating one at the pivot and the other at the point last mentioned, said last mentioned scales having indicia thereon dividing the lines thereon into equal parts, designating the differences between the diameters of the different circles with which the device may be used.

In testimony whereof I affix my signature.

LESTER MAY CRAIG.